(12) United States Patent
Brault et al.

(10) Patent No.: US 11,352,906 B2
(45) Date of Patent: Jun. 7, 2022

(54) DYNAMIC SEALING BETWEEN TWO ROTORS OF AN AIRCRAFT TURBOMACHINE

(71) Applicant: SAFRAN AIRCRAFT ENGINES, Paris (FR)

(72) Inventors: Michel Gilbert Roland Brault, Moissy-Cramayel (FR); Romain Guillaume Cuvillier, Moissy-Cramayel (FR); Julien Fabien Patrick Becoulet, Moissy-Cramayel (FR); Arnaud Nicolas Negri, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 154 days.

(21) Appl. No.: 16/956,407

(22) PCT Filed: Dec. 20, 2018

(86) PCT No.: PCT/FR2018/053442
§ 371 (c)(1),
(2) Date: Jun. 19, 2020

(87) PCT Pub. No.: WO2019/122739
PCT Pub. Date: Jun. 27, 2019

(65) Prior Publication Data
US 2021/0087947 A1 Mar. 25, 2021

(30) Foreign Application Priority Data
Dec. 22, 2017 (FR) .................................. 1763040

(51) Int. Cl.
*F01D 25/18* (2006.01)
*F16J 15/16* (2006.01)
(52) U.S. Cl.
CPC .......... *F01D 25/183* (2013.01); *F16J 15/162* (2013.01); *F05D 2220/32* (2013.01); *F05D 2240/55* (2013.01); *F05D 2260/98* (2013.01)
(58) Field of Classification Search
CPC ............... F01D 25/183; F05D 2220/32; F05D 2240/55; F05D 2260/98; F16J 15/162
See application file for complete search history.

(56) References Cited

U.S. PATENT DOCUMENTS 6,098,753 A * 8/2000 Lamarre ................. F01D 25/18
184/6.11
2002/0028148 A1 * 3/2002 Hohkita ................ F01D 25/183
417/407

(Continued)

FOREIGN PATENT DOCUMENTS

FR 2983908 A1 6/2013
FR 2985763 * 7/2013 .............. F01D 11/00

(Continued)

OTHER PUBLICATIONS

International Search Report received for PCT Patent Application No. PCT/FR2018/053442, dated Apr. 17, 2019, 5 pages (2 pages of English Translation and 3 pages of Original Document).

*Primary Examiner* — David E Sosnowski
*Assistant Examiner* — Theodore C Ribadeneyra
(74) *Attorney, Agent, or Firm* — Womble Bond Dickinson (US) LLP

(57) ABSTRACT

Dynamic sealing device for an aircraft turbomachine, comprising two rotors (3, 8) which are configured to rotate about the one same axis (A) and different speeds, the said rotors extending at least in part around one another and dynamic sealing means (14) being mounted between the said rotors, characterized in that: —the said sealing means comprise annular rings (38) extending about the said axis, these rings being mounted with the ability to slide on a first (3) of the said rotors, in a radial direction with respect to the said axis, and being able to bear radially via their external periphery against a second (8) of the said rotors which at least partially surrounds the said first rotor, and in that it further comprises: —oil discharge means comprising an annular cavity (44) formed in the said second rotor, the said annular cavity opening radially towards the inside in the vicinity of the said sealing means and being in fluidic communication with oil passage ports (45) formed in the bottom of the cavity and passing through the said second rotor.

11 Claims, 4 Drawing Sheets

(56) References Cited

U.S. PATENT DOCUMENTS

| | | | | |
|---|---|---|---|---|
| 2006/0033289 | A1* | 2/2006 | Gaebler | F16J 15/42 |
| | | | | 277/427 |
| 2014/0334913 | A1* | 11/2014 | Igel | F01D 11/04 |
| | | | | 415/110 |
| 2016/0032765 | A1* | 2/2016 | Shuaib | F16C 33/7896 |
| | | | | 277/348 |
| 2017/0016350 | A1* | 1/2017 | Miller | F01D 25/183 |
| 2018/0119557 | A1* | 5/2018 | Amador | F04D 29/102 |
| 2018/0245631 | A1* | 8/2018 | Nakayama | F16F 15/0237 |
| 2018/0291756 | A1* | 10/2018 | Miller | F16J 15/3452 |
| 2018/0291815 | A1* | 10/2018 | Munson | F02C 7/28 |
| 2018/0313228 | A1* | 11/2018 | Phui | F04D 29/4293 |

FOREIGN PATENT DOCUMENTS

| | | |
|---|---|---|
| FR | 2985763 A1 | 7/2013 |
| WO | 2015/075345 A1 | 5/2015 |
| WO | 2015/075355 A1 | 5/2015 |

* cited by examiner

DYNAMIC SEALING BETWEEN TWO ROTORS OF AN AIRCRAFT TURBOMACHINE

TECHNICAL FIELD

This invention relates to the field of the dynamic sealing between two rotors of an aircraft turbomachine, and in particular a turbomachine equipped with an epicyclic or planetary reduction gear.

BACKGROUND

The prior art comprises the documents FR-A1-2 983 908, FR-A1-2 985 763, WO-A1-2015/075345, and WO-A1-2015/075355.

A turbomachine, such as a dual-flow turbojet engine, conventionally comprises an air inlet comprising a fan, the outlet air flow of which divides into an air flow that enters the engine and forms a hot flow or primary flow, and an air flow that flows around the engine and forms a cold flow or secondary flow.

The engine typically comprises from upstream to downstream, in the direction of gas flow, at least one compressor, a combustion chamber, at least one turbine, and an exhaust nozzle in which the combustion gases leaving the turbine and forming the primary flow are mixed with the secondary flow.

In the case of a turbojet engine with reduction gear, the turbine shaft drives the fan shaft via the reduction gear which is lubricated and housed in an upstream lubrication enclosure. According to the type of reduction gear used, planetary or epicyclic, the fan shaft will rotate in the same or opposite direction to the turbine shaft, and the fan shaft will rotate at a lower speed than that of the turbine shaft.

Sealing means are provided at the terminals of the lubrication enclosure in order to control the oil leaks and to direct them preferentially to degassing means. The document WO-A1-2015/075355 describes, for example, dynamic sealing means, of the labyrinth type, provided between the fan shaft and the input shaft of the reduction gear.

This invention represents an improvement to the current technology.

DISCLOSURE OF THE INVENTION

According to a first embodiment, the invention relates to an aircraft turbomachine having a longitudinal axis A, comprising a reduction gear, at least one turbine shaft, an upstream end of which is connected to an input shaft of the reduction gear, a fan, a shaft of which is connected to an output shaft of the reduction gear, and dynamic sealing means between said input shaft of the reduction gear and said fan shaft, characterised in that said sealing means comprise an annular cowling, the axial cross-section of which is substantially U-shaped, an outer annular leg of which is fastened to said fan shaft and an inner annular leg of which supports at least one annular sealing joint co-operating with said input shaft of the reduction gear, said cowling being elastically deformable in the radial direction with respect to said axis A.

The cowling is elastically deformable in the radial direction which confers a certain flexibility to the sealing means in this direction and thus allows misalignments of the shafts during operation. The sealing joint(s) are thus more effective and thus guarantee calibration of a ventilation air flow rate and/or oil passage limitation between the input shaft of the reduction gear and the output shaft of the reduction gear.

The turbomachine according to the invention may comprise one or more of the following features, taken in isolation from one another or in combination with one another:
- said U-shaped cowling defines an annular opening which opens axially downstream;
- said outer annular leg comprises a downstream end for fastening to said fan shaft;
- said outer annular leg and said fan shaft define therebetween a fluid flow annular space which is in fluidic communication with orifices formed in said fan shaft;
- the downstream end of said outer annular leg comprises oil passage orifices;
- the downstream end of said outer annular leg supports an annular cover extending radially towards the inside and configured to limit the oil splashes and/or ensure the oil flow,
- said inner annular leg comprises a radially outer annular rib configured to limit the oil splashes and/or ensure the oil flow;
- said inner annular leg extends at least partly radially inside of said input shaft of the reduction gear;
- said at least one annular joint comprises sealing annular segments which are each mounted with the ability to slide in a radial direction in annular slots of said inner annular leg and which are configured to lean at their outer periphery against said input shaft of the reduction gear,
- said annular segments each have in axial cross-section a generally rectangular shape, the corners of which are rounded convex;
- said input shaft of the reduction gear comprises at least one hardened cylindrical track intended to cooperate with said at least one joint, and/or radial oil passage through-orifices.

According to another embodiment, the invention relates to a dynamic sealing device for an aircraft turbomachine, comprising two rotors configured to rotate about the same axis and at different speeds, said rotors extending at least partly around each other and dynamic sealing means being mounted between said rotors, characterized in that:
- said sealing means comprise annular segments extending about said axis, said segments being mounted with the ability to slide on a first of said rotors, in a radial direction with respect to said axis, and being capable of leaning radially via their outer periphery against a second of said rotors which at least partly surrounds said first rotor, and in that it further comprises:
- oil draining means comprising an annular cavity formed in said second rotor, said annular cavity opening radially towards the inside in the vicinity of said sealing means and being in fluidic communication with oil passage orifices formed at the bottom of the cavity and passing through said second rotor.

The device thus proposes to combine two functions to optimize the sealing properties. The first function is provided by the sealing segments, the number of which is chosen to guarantee an optimum sealing. They are, for example, configured to limit the passage of oil and/or calibrate a ventilation air flow in a lubrication enclosure. The second function is provided by the cavity and the orifices that allow the oil draining.

The device according to the invention may comprise one or more of the following features, taken in isolation from each other or in combination with each other:

said sealing means comprise between three and six annular segments;

said annular segments are mounted with the ability to slide independently of each other in annular slots of said first rotor;

said annular segments each have in axial cross-section a generally rectangular shape, the corners of which are rounded convex;

said annular segments are distributed in pair(s) or trio(s);

said annular segments are located on one side of said annular cavity or are distributed on both sides of said annular cavity;

said second rotor comprises at least one hardened cylindrical track and on which are leaning said annular segments;

said at least one cylindrical track is connected at an axial end to a frustoconical surface configured to facilitate the mounting by insertion of said first and second rotors;

the device further comprising a radially outer annular oil-guiding rib, which is supported by or mounted on said first rotor, and configured to guide the oil to said annular cavity;

said sealing means are formed by assembling a plurality of annular parts coaxially mounted on said first rotor and axially clamped to each other by means of a nut screwed onto said first rotor.

Advantageously, the features of the different aspects of the invention can be combined.

DESCRIPTION OF THE FIGURES

The invention shall be better understood and other details, features and advantages of the invention shall be apparent from the following description, made by way of non-limitative example and with reference to the drawings annexed hereto, in which.

DETAILED DESCRIPTION

Figure 1:
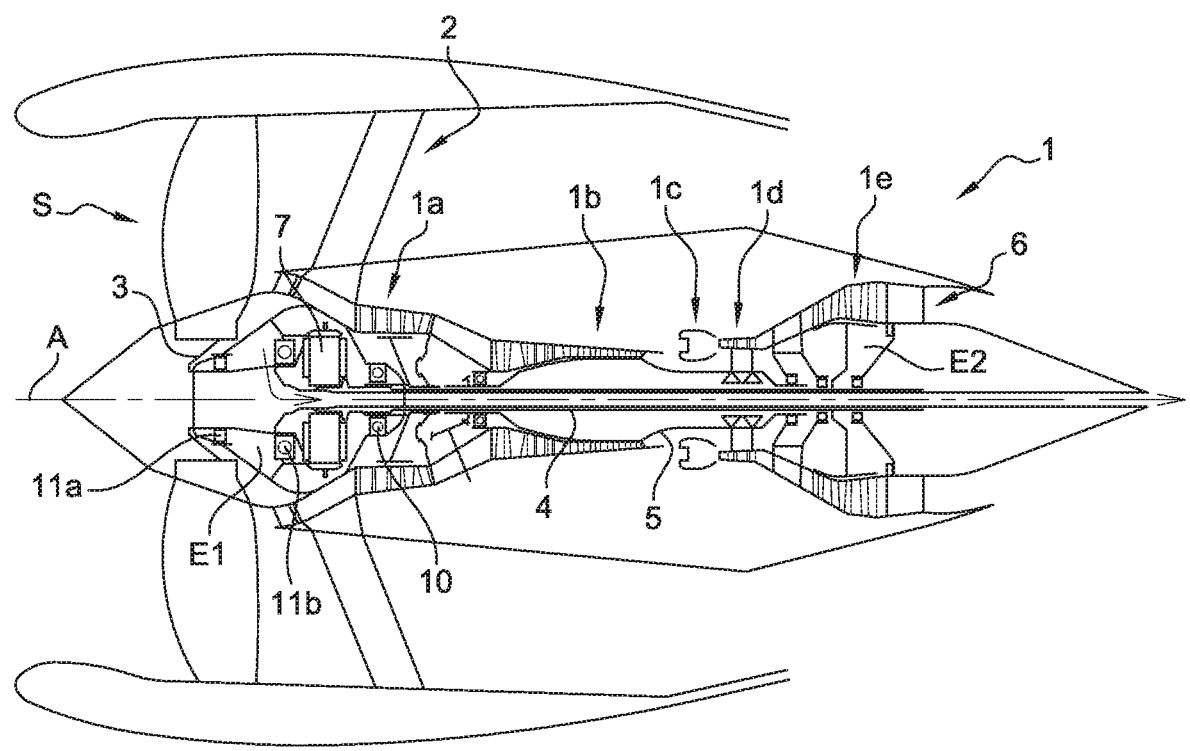
FIG. 1 is a schematic axial cross-sectional view of a turbomachine with reduction gear of an aircraft.

Referring to FIG. 1, we see a turbomachine 1 with reduction gear, which conventionally consists of a fan S, a low-pressure compressor 1a, a high-pressure compressor 1b, a combustion chamber 1c, a high-pressure turbine 1d and a low-pressure turbine 1e. The rotors of the high-pressure compressor 1b and the high-pressure turbine 1d are connected by a high-pressure shaft 5 and form a high-pressure (HP) body with it.

The rotors of the low-pressure compressor 1a and the low-pressure turbine 1e are connected by a low-pressure shaft 4 and form a low-pressure (LP) body with it. The shaft 3 of the fan S is driven via a reduction gear 7 by the LP shaft 4.

The HP and LP shafts extend along an axis A which is the axis of rotation of the turbomachine 1. In the rest of the description, the notions of longitudinal or radial, and inside or outside, are relative to this axis.

The turbomachine 1 comprises structural casings. The HP body is held by two structural casings: the inter-compressor casing and the inter-turbine casing, and the LP body is held by at least two structural casings: the intermediate casing 2 and the inter-turbine casing and/or the exhaust casing 6.

The intermediate casing 2 supports bearings of the LP turbine shaft 4 which are housed in a front or upstream enclosure marked E1. The exhaust casing 6 supports bearings of the LP turbine shaft 4 which are housed in a rear or downstream enclosure marked E2.

The reduction gear 7 is here of the epicyclic type. FIG. 1 shows in a very schematic way the space requirement for the planet gears of this reduction gear.

The reduction gear 7 comprises an input shaft 8 which extends upstream of the LP shaft 4 and is guided by a downstream bearing 10 supporting this LP shaft. The output torque of this reduction gear 7 is transmitted to the fan shaft 3 by a conventional connection, such as, for example, a fastening of this fan shaft to the planet carriers forming an output shaft of the reduction gear, in the case of an epicyclic reduction gear. The output shaft of the reduction gear is guided by further bearings 11a, 11b, preferably a roller bearing 11a and a ball bearing 11b.

Figure 3:
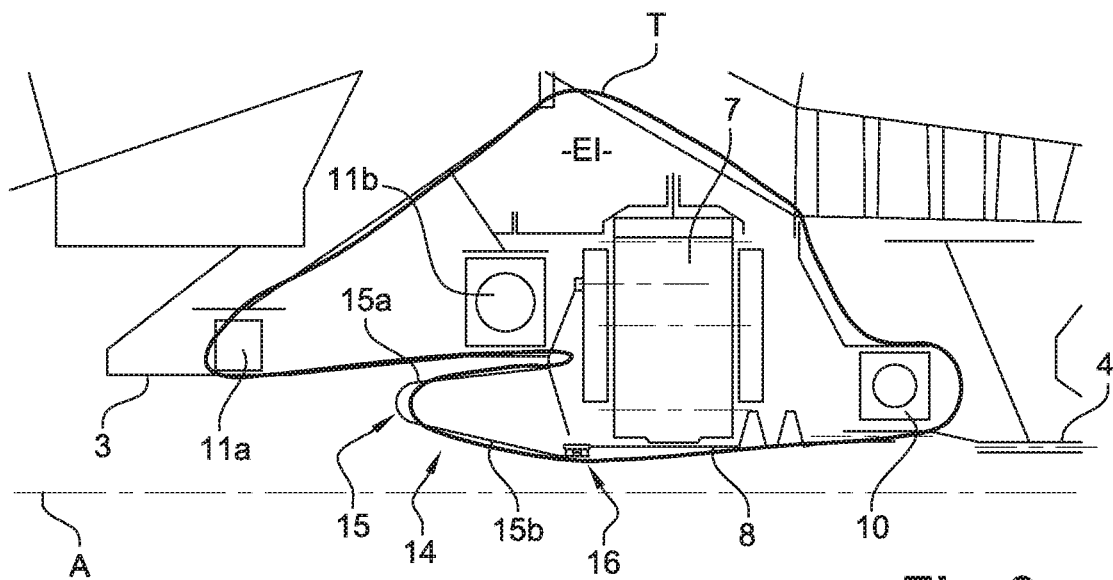
FIGS. 3 and 4 are partial schematic axial cross-sectional views of an aircraft turbomachine according to the invention.
Figure 4:
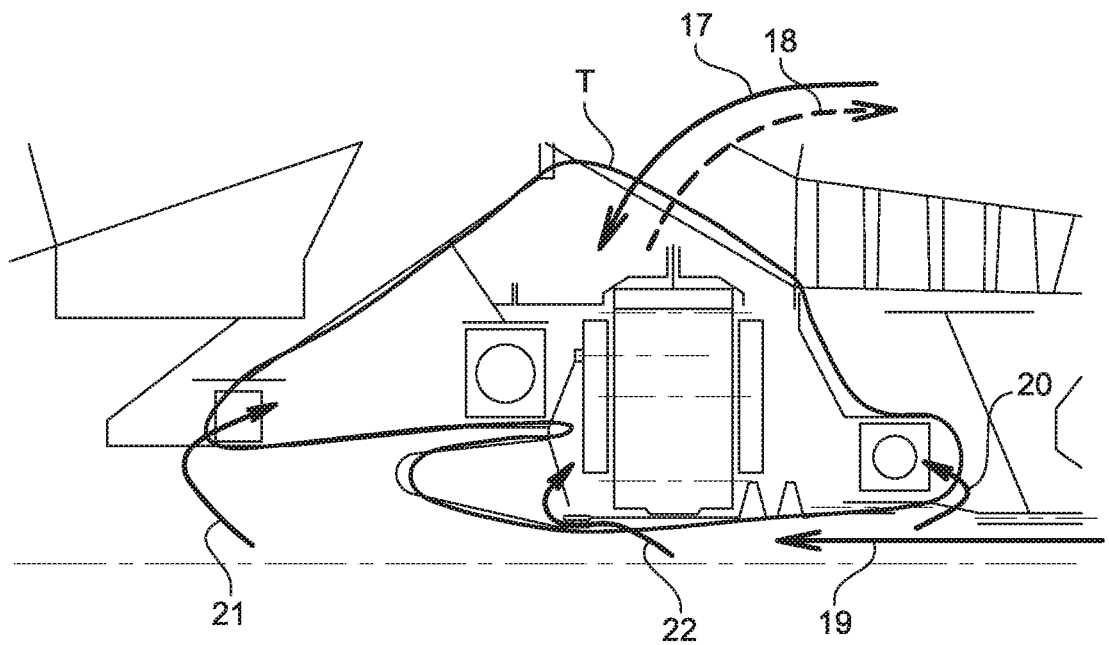

As can be seen in FIGS. 3 and 4, the bearings 10, 11a, 11b and the reduction gear 7 are located inside the front lubrication enclosure E1 defined by a continuous line T.

The enclosure E1 is defined by fixed walls and movable walls. The supports of the bearings form fixed walls and the shafts form movable walls.

Figure 2:
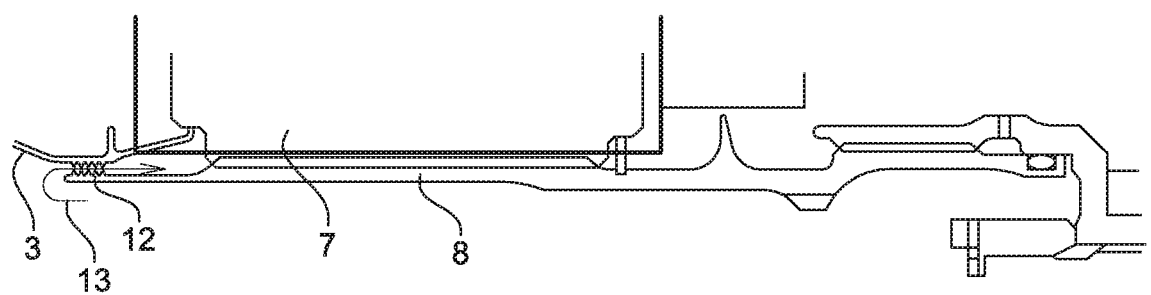
FIG. 2 is a larger scale schematic view of a part of FIG. 1, and shows sealing means of the prior art.

The input shafts 8 of the reduction gear and the fan shaft 3 rotate at different speeds and sealing means are fitted between them. FIG. 2 shows sealing means 12 of the labyrinth type from the prior art, which are configured to allow the passage of pressurizing gas flow rate inside the enclosure during operation (arrow 13).

FIGS. 3 and 4 represent sealing means 14 according to the invention, which represent an improvement over the prior art.

In the example shown, the sealing means 14 partly define the enclosure E1 and comprise an annular cowling 15 with a substantially U-shaped axial cross-section, an outer annular leg 15a of which is fastened to the fan shaft 3 and an inner annular leg 15b of which supports at least one annular sealing joint 16 cooperating with the input shaft 8 of the reduction gear.

The U-shape of the cowling 15 allows it to be elastically deformable in the radial direction with respect to the axis A and to compensate for misalignments of the shafts 3, 8, while ensuring a sealing between these shafts by means of the joint(s) 16.

As schematically shown in FIG. 4, the bearings 10, 11a and 11b as well as the reduction gear 7 are lubricated for optimum operation. The oil is supplied by suitable means (arrows 17). These means are usually pipes and sprinklers targeting the components to be lubricated. The bearings 10, 11a are located at the axial ends of the enclosure E1. The bearing supports have ventilation holes which allow the ventilation air to pass through from the enclosure. The enclosure E1 is configured so that the air-oil mixture, which forms an oil mist inside the enclosure, is contained therein. Between the rotor and stator walls of the enclosure, for example here at the upstream and downstream ends of the enclosure, the sealing means (such as labyrinths) are used to contain the oil, and an air circuit pressurizes these seals to prevent oil leakage. The sealing means can also be between two movable walls, as is the case for a sealing between two shafts, and in particular between the shafts 3, 8. A gas flow rate is taken from the LP or HP compressor of the turbomachine and supplies all the seals of the enclosure E1. The arrow 19 represents the common supply which is divided into several flows (arrows 20, 21, 22) passing through the different seals.

The enclosure E1 is then pressurized (air is continuously entering therein, pushing back the oil that may have escaped from the seals by capillary action) and the bearings operate in a mixed oil and air environment. The oil remains contained in the lubrication circuit. The supply of the bearings are provided by a supply tube and the oil recovery is provided by a specific recovery tube generally located at a low point in the enclosure. To avoid overpressure in the enclosure, and to allow a constant flow of incoming air, the inside of the enclosure is pressurised with air at a lower pressure than the pressure of the air entering the seals. This air loaded with oil particles, which is evacuated at the level of this pressure well, must first be treated to recover almost all of the oil it carries. For this, the oiled air will be brought to an oil separator which will separate the air from the oil it carries and reject the oil-free air outside the engine.

Figure 5:
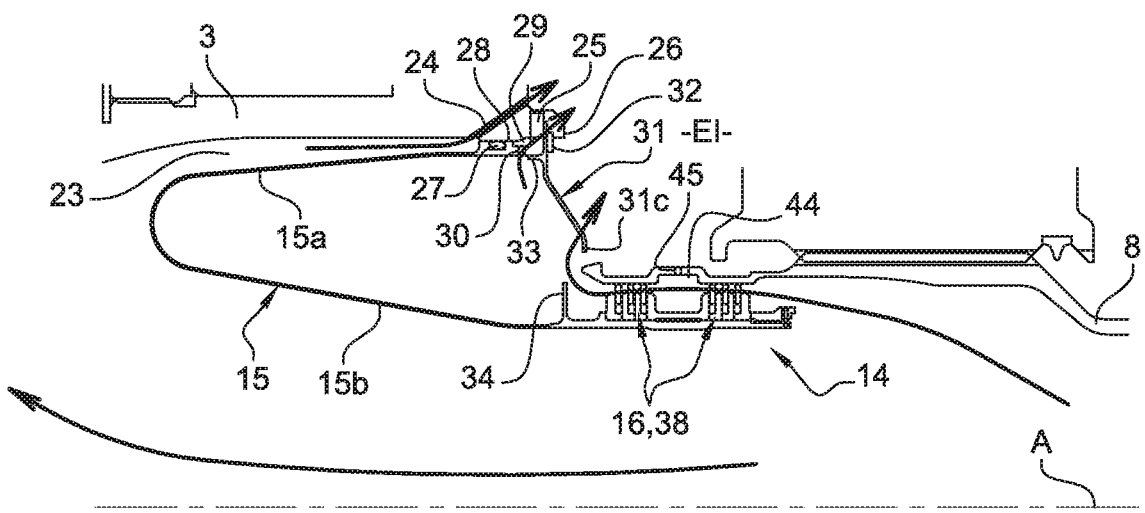
FIG. 5 is a partial schematic axial cross-sectional view of a dynamic sealing device according to the invention.
Figure 10:
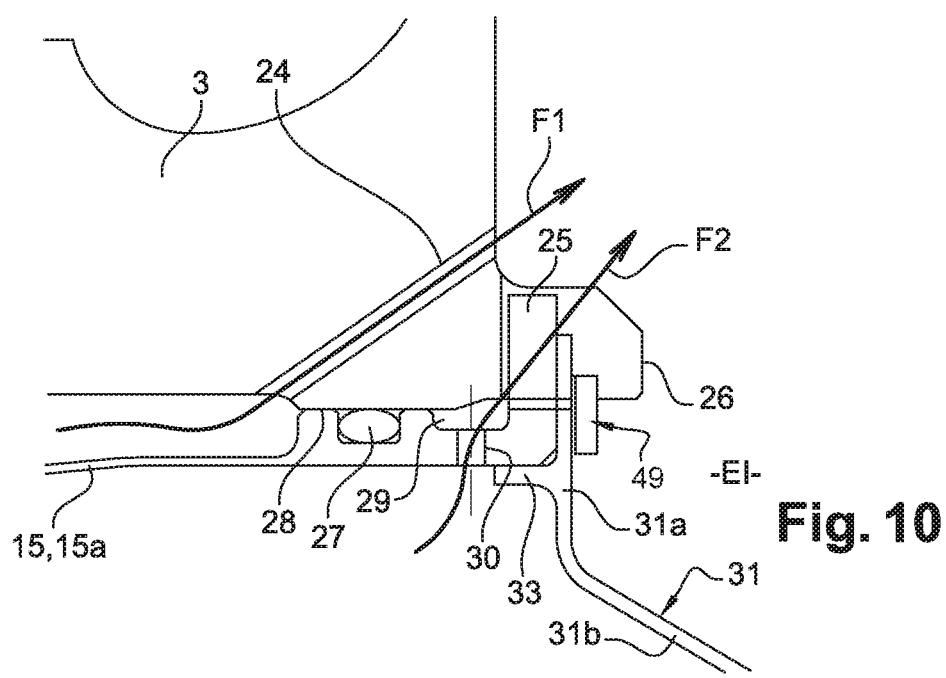
FIG. 10 is a larger scale schematic view of a detail of FIG. 5.

FIG. 5 shows a more concrete embodiment of the sealing means 14, and FIG. 10 shows a larger scale of a detail of FIG. 5.

With regard to the U-shaped cowling 15, it can be noted that it defines an annular opening which opens axially downstream in the example shown. This opening opens to the enclosure E1 and thus forms a part thereof. It therefore contains an oil mist during operation.

The outer annular leg 15*a* of the cowling 15 has a generally cylindrical or frustoconical shape and extends substantially parallel to and at a short radial distance from a portion of the shaft 3. The leg 15*a* and the shaft 3 define an annular space 23 between them. The shaft 3 comprises an annular row of through-orifices 24 which open, on the one hand upstream, into the space 23, and on the other hand downstream, into the enclosure E1. The space 23 is thus in fluidic communication with the enclosure E1 via the orifices 24. In the example shown, the orifices 24 extend radially outwards from the upstream to the downstream. During operation, the oil entering the space 23 would be routed to the orifices 24 and thus return to the enclosure E1 (arrow F1).

The outer leg 15*a* comprises, at its downstream end, means for fastening to the shaft 3. In the example shown, these fastening means comprise a radially outer annular rim 25, which is serrated and comprises an annular row of axial notches defining teeth between them. This end is engaged by jaw clutching into a complementary cylindrical rim 26 of the shaft 3. This rim 26 comprises an annular row of radial notches defining teeth between them. The teeth of the rim 25 are intended to be engaged in the notches of the rim 26, and the teeth of the rim 26 are intended to be engaged in the notches of the rim 25. The teeth cooperate with each other to form an anti-rotation device. The number of teeth per rim 25, 26 is for example between 1 and 10.

The mounting of the cowling 15 on the shaft 3 can be done by simple axial translation from one to the other, until the teeth mentioned above are engaged.

The cowling 15 and the shaft 3 are secured axially relative to each other by an annular segment 49 engaged in an annular groove of the rim 26, which opens radially towards the inside.

The downstream end of the leg 15*a* further comprises an outer annular groove which opens radially outwards and in which an O-ring joint 27 is housed, clamped between the bottom of this groove and the shaft 3. The groove is here formed in a radial overthickness of the leg 15*a* which comprises an outer cylindrical surface which cooperates with a complementary inner cylindrical surface 28 of the shaft 3 for centering the cowling. The cowling 15 can be held axially in place by shrinking these cylindrical surfaces together during the mounting. The surface 28 extends axially between the outlets of the orifices 24 in the space 23, and a downstream radial surface of the shaft 3.

Between the outer cylindrical surface and the rim 25, the leg 15*a* may comprise a radially outer annular groove 29. Radial through-orifices 30 are formed in the leg 15*a* and open into this groove 29 to allow the passage of oil radially from the inside towards the outside, from the opening defined by the cowling 15 to the rest of the enclosure E1 (arrow F2). The oil will then flow between the above-mentioned teeth of the rims 25, 26.

The downstream end of the leg 15*a* supports an annular cover 31 extending radially towards the inside and configured to limit the oil splashes and/or ensure the oil flow. The cover 31 comprises here a substantially radially outer portion 31*a*, a substantially frustoconical middle portion 31*b* here widened upstream, and a radially inner portion 31*c*. The radially outer portion 31*a* is axially plated on the rim 25 of the leg 15*a* by the segment S. This portion 31*a* is serrated, its teeth being aligned with the teeth of the rim 25 and engaged with the teeth of the rim 25, between the teeth of the rim 26. The radially outer portion 31*a* of the cover 31 further comprises a cylindrical rim 33 facing upstream and cooperating by centering with an inner cylindrical surface of the downstream end of the leg 15*a*.

The oil which passes into the volume of the cowling 15, despite the annular cover 31, is thus not retained by the latter but is evacuated through the radial orifices 30 and through the teeth of the rims 25 and 26.

The radially inner portion 31*c* of the cover 31 extends substantially opposite the upstream end of the input shaft 8 of the reduction gear.

The upstream end of the cowling 15 has a generally rounded axial cross-sectional shape. The inner annular leg 15 of the cowling comprises a downstream end portion which is located radially inside of an upstream end portion of the shaft 8. The sealing joint(s) 16 are located in the radial space extending between these end portions.

The inner annular leg 15*b* comprises, on this downstream end portion, a radially outer annular rib 34 which extends here in a radial plane, this plane being located upstream of the upstream end of the shaft 8 and passing through the middle portion of the cover 31. The rib 34 forms a stiffener, so that the leg 15 maintains good circularity. Advantageously, it is further configured to limit the oil splashes and/or ensure the oil flow. The rib 34 is located at the upstream end of a radial overthickness of the leg 15*b* in the example shown.

The downstream end portion of the leg 15*b* comprises an outer cylindrical surface 35 on which the sealing joint(s) 16 are mounted. This surface 35 extends axially between a radially outer annular rim 36, upstream, and an outer thread 37, downstream (FIG. 6).

Figure 6:
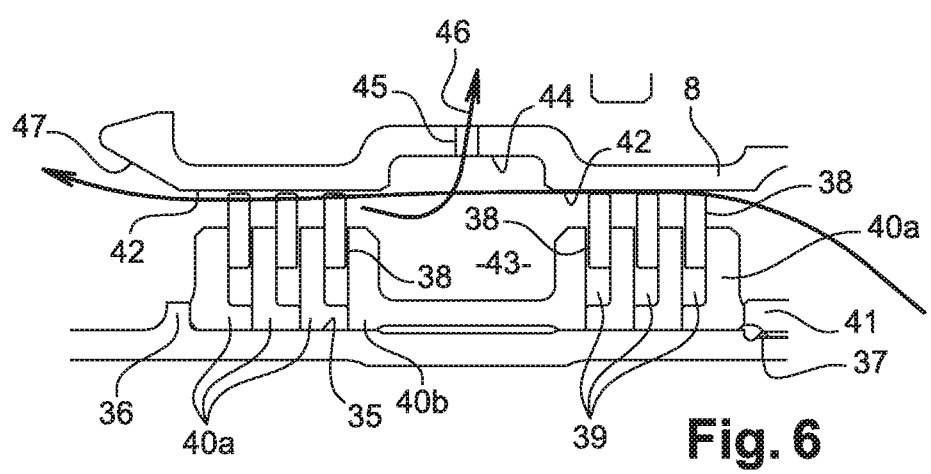
FIG. 6 is a partial schematic view in axial cross-sectional view of an embodiment of dynamic sealing means according to the invention.
Figure 7:
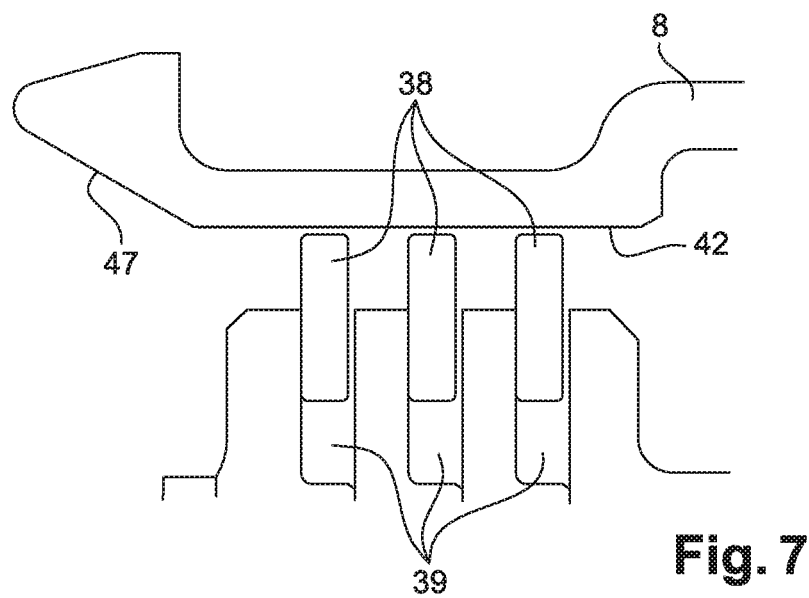
FIG. 7 is a larger scale schematic view of a detail of FIG. 6, FIGS. 8 and 9 are schematic views similar to FIG. 6 and showing alternative embodiments of the dynamic sealing means.

FIGS. 6 and 7 show a first embodiment of sealing joints which are sealing annular segments 38.

The segments 38 are each mounted with the ability to slide in radial direction on the leg 15b and are configured to lean at their outer periphery against the input shaft 8 of the reduction gear.

The segments 38 extend about the axis A and have their inner periphery radially mounted with the ability to slide in radial slots 39 which are formed here by the assembly of several annular parts.

Each slot 39 is bounded axially by two rings 40a, 40b mounted axially against each other, engaging them on the cylindrical surface 35 of the leg 15b. Some rings, such as the rings 40a, have a small axial dimension and extend between two adjacent segments 38, spacing them by a small axial distance. Other rings, such as the ring 40b, has a larger axial dimension and extends between two adjacent segments 38 spacing them by a greater axial distance. This allows to distribute the segments 38 along the surface 35 and to distribute them in pairs, trios or otherwise.

In the example shown, six segments 38 are mounted around the leg 15b. They are distributed in trios, a first upstream trio in which the segments are interspersed with each other by the rings 40a, and a second downstream trio in which the segments are interspersed with each other by further rings 40a. The trios are further separated from each other by a ring 40b.

The rings 40a are generally L-shaped in axial cross-section and the ring 40b is generally U-shaped in axial cross-section. The ring 40b thus defines an annular space 43 opening radially outwards and located between the two trios of segments 38.

The rings 40a, 40b are engaged by sliding on the surface 35 and are clamped axially against each other between the rim 36 on which the most upstream ring 40a is leaning on axially, and a nut 41 which is screwed onto the thread 37 and is leaning axially against the most downstream ring 40a.

The segments 38 are shaped and dimensioned to allow their radial movements during operation in the slots 39. They have in axial cross-section a generally rectangular shape, the corners of which are preferably convexly rounded to limit the wear by contact of the rings 40a, 40b as well as of the shaft 8. Preferably, they each comprise an outer peripheral contact surface having a convexly curved cross-sectional shape so as to accept misalignments of the shafts 3, 8. Each segment comprises an inner diameter which is between the inner and outer diameters of the slots 39, and an outer diameter which is greater than the outer diameter of the slots and which is slightly less than the inner diameter of the cylindrical tracks 42 on which the segments are leaning radially against.

In the example shown, the upstream end portion of the input shaft 8, which extends around the leg 15b, comprises, between the two cylindrical tracks 42, an annular cavity 44 opening radially towards the inside and radially aligned with the aforementioned space 43 extending between the trios of segments 38. An annular row of oil passage orifices 45 (arrow 46) is formed at the bottom of this cavity 44 to allow the return of oil by centrifugation inside the enclosure E1. The cavity 44 and the orifices 45 thus form oil draining means.

The tracks 42 are advantageously hardened by a particular coating or a particular treatment, limiting its wear by contact and friction with the segments 38.

The cylindrical track 42 located upstream is connected by its upstream end to a frustoconical surface 47 widened upstream which facilitates a mounting step of the turbomachine, by inserting the downstream end portion of the leg 15b radially inside the shaft 8.

Figure 8:
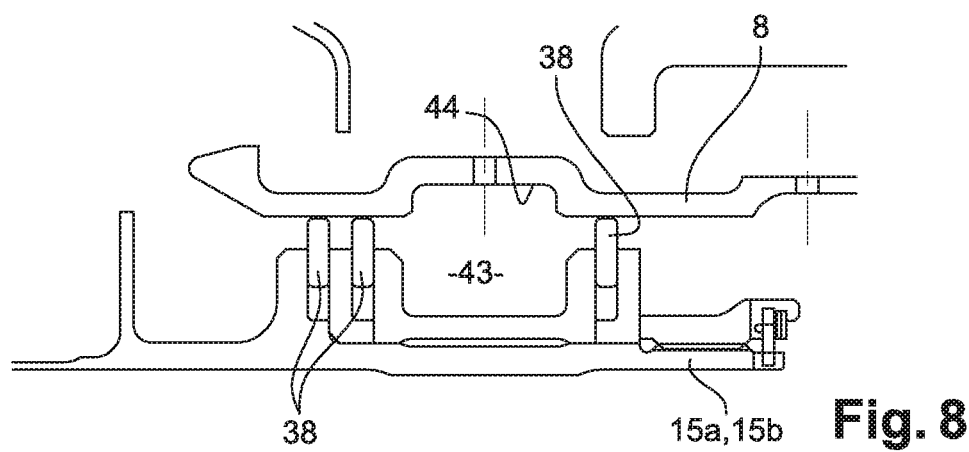
Figure 9:
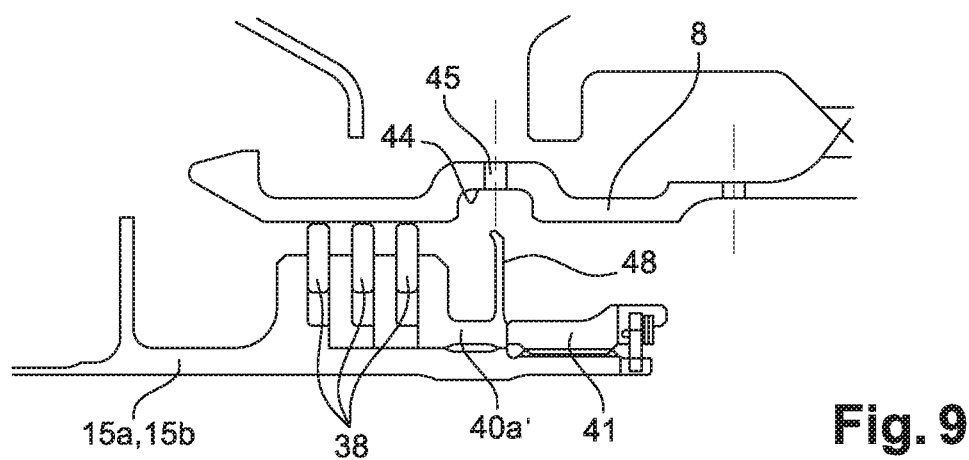

FIGS. 8 and 9 show some alternative embodiments.

FIG. 8 shows three-segment sealing means 38 of which two form a pair and are located upstream of the cavity 44, and another is located downstream of this cavity.

FIG. 9 also shows a three-segment 38 sealing means, but which forms a trio located upstream of the cavity 44. The ring 40a' located between the most downstream segment 38 and the nut 41 comprises a radially outer annular rib 48, which extends substantially opposite the orifices 45. This rib 48 is configured to improve oil flow by centrifugation during operation into the cavity 44.

In conclusion, the rotor/rotor sealing of the enclosure E1 is achieved by the segments 38, which preferably extend continuously over 360°, and which are supported by the cowling 15 forming a flexible pin so that the sealing can absorb the radial disparities of the input shaft 8 of the reduction gear 7. These radial disparities can vary by several millimetres, for example up to 3 mm and preferably about 1.5 mm. The cover 31 enables oil to be collected as close as possible to the reduction gear 7 and minimises the oil splashes towards the sealing means 14. The rib 34 consolidates the cowling 15 as a stiffener and also as a protective partition of the sealing means 14.

The segments 38 are made of carbon or cast iron, for example.

Alternatively, the segments could be split or even replaced by annular brush joints or floating rings.

In addition to the advantages described above, the invention is useful to the extent that allows to maintain a modular mounting of the turbomachine, as described in the patent application WO-A1-2015/075345, as well as the principle of tight sealing of the front enclosure E1, as described in the application WO-A1-2015/075355.

The invention claimed is:

1. A dynamic sealing device for an aircraft turbomachine, comprising two rotors configured to rotate about the same axis and at different speeds, said rotors extending at least partly around each other and dynamic sealing means being mounted between said rotors, wherein:

said sealing means comprise annular segments extending about said axis, said segments being mounted with the ability to slide on a first of said rotors, in a radial direction with respect to said axis, and being capable of leaning radially via their outer periphery against a second of said rotors which at least partly surrounds said first rotor, and oil draining means comprising an annular cavity formed in said second rotor, said annular cavity opening radially towards the inside in the vicinity of said sealing means and being in fluidic communication with oil passage orifices formed at the bottom of the cavity and passing through said second rotor, said annular cavity being directly placed side by side with said segments.

2. The device according to claim 1, wherein said sealing means comprise between three and six annular segments.

3. The device according to claim 2, wherein said annular segments are mounted with the ability to slide independently of each other in annular slots of said first rotor.

4. The device according to claim 1, wherein said annular segments are mounted with the ability to slide independently of each other in annular slots of said first rotor.

5. The device according to claim 1, wherein said annular segments each have in axial cross-section a generally rectangular shape, the corners of which are rounded convex.

6. The device according to claim 1, wherein said annular segments are distributed in pair(s) or trio(s).

7. The device according to claim 1, wherein said annular segments are located on one side of said annular cavity or are distributed on both sides of said annular cavity.

8. The device according to claim 1, wherein said second rotor comprises at least one hardened cylindrical track and on which are leaning said annular segments.

9. The device according to the claim 8, wherein said at least one cylindrical track is connected at an axial end to a frustoconical surface configured to facilitate the mounting by insertion of said first and second rotors.

10. The device according to claim 1, further comprising a radially outer annular oil-guiding rib, which is supported by or mounted on said first rotor, and configured to guide the oil to said annular cavity.

11. The device according to claim 1, wherein said sealing means are formed by assembling a plurality of annular parts coaxially mounted on said first rotor and axially clamped to each other by means of a nut screwed onto said first rotor.

\* \* \* \* \*